United States Patent
Wu

(10) Patent No.: US 10,084,526 B2
(45) Date of Patent: Sep. 25, 2018

(54) PATH DETECTION METHOD AND DEVICE, AND SPHERE DECODING DETECTION DEVICE

(71) Applicant: Sanechips Technology Co., Ltd., Shenzhen, Guangdong (CN)

(72) Inventor: Gang Wu, Shenzhen (CN)

(73) Assignee: Sanechips Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/328,883

(22) PCT Filed: Dec. 1, 2014

(86) PCT No.: PCT/CN2014/092693
§ 371 (c)(1),
(2) Date: Jan. 24, 2017

(87) PCT Pub. No.: WO2015/117479
PCT Pub. Date: Aug. 13, 2015

(65) Prior Publication Data
US 2017/0214450 A1    Jul. 27, 2017

(30) Foreign Application Priority Data
Jul. 25, 2014  (CN) .......................... 2014 1 0359243

(51) Int. Cl.
*H04B 7/08*        (2006.01)
*H04L 1/00*        (2006.01)
*H04B 7/0413*      (2017.01)

(52) U.S. Cl.
CPC ......... *H04B 7/0845* (2013.01); *H04L 1/0054* (2013.01); *H04B 7/0413* (2013.01)

(58) Field of Classification Search
CPC .... H04B 7/0845; H04B 7/0413; H04L 1/0054
See application file for complete search history.

(56) References Cited

U.S. PATENT DOCUMENTS 6,654,928 B1 * 11/2003 Terry ...................... H04L 1/006
                                                    375/267
7,266,548 B2 *  9/2007 Weare ............... G06F 17/30734
(Continued)

FOREIGN PATENT DOCUMENTS

| CN | 101662342 A | 3/2010 |
| CN | 103188037 A | 7/2013 |
| CN | 103326813 A | 9/2013 |

OTHER PUBLICATIONS

Supplementary European Search Report in European application No. 14881983.2, dated Jul. 18, 2017, 9 pgs.
(Continued)

*Primary Examiner* — Freshteh N Aghdam
(74) *Attorney, Agent, or Firm* — Cooper Legal Group, LLC

(57) ABSTRACT

The disclosure discloses a path detection method including after obtaining an equalizing signal of a received signal, Maximum Likelihood (ML) path detection and ML complementary set path detection are performed on the equalizing signal according to the pre-set maximum number of reserved nodes and maximum number of expanded branches of each layer; in the process of the detections, an accumulated path measurement value is calculated after finishing the search of each layer and each path, and the accumulated path measurement value is compared with a pre-set search measurement threshold; when the accumulated path measurement value is less than the search measurement threshold, the search of this path is continued; otherwise the search of this path is finished and the search of the next path is started until all the paths are searched. The disclosure also discloses a path detection device, Sphere Decoding (SD) detection device and computer storage medium.

20 Claims, 4 Drawing Sheets

(56) References Cited

U.S. PATENT DOCUMENTS

| | | | |
|---|---|---|---|
| 9,008,237 B2* | 4/2015 | Eder | H04B 7/0452 375/224 |
| 2008/0232500 A1 | 9/2008 | Oh | |
| 2010/0014606 A1* | 1/2010 | Chen | H04L 25/03242 375/262 |
| 2010/0086067 A1* | 4/2010 | Oka | H04B 7/0413 375/260 |
| 2010/0157785 A1* | 6/2010 | Song | H04L 25/03203 370/203 |
| 2012/0269303 A1* | 10/2012 | Paker | H04L 25/03242 375/341 |

OTHER PUBLICATIONS

"FPGA Implementation of Dynamic Threshold Sphere Detection for MIMO Systems", 2006, Kiarash Amiri and Joseph R. Cavaliaro, IEEE Xplore Conference, Fortieth Asilomar Conference on Signals, Systems and Computers, pp. 94-98.

"Probability-Distribution-Based Node Pruning for Sphere Decoding", 2012, Tao Cui, Shuangshuag Han and Chintha Tellambura, IEEE Transactions on Vehicular Technology, IEEE Service Center, Piscataway, NJ, US, vol. 62, No. 4, pp. 1586-1596.

"Accelerated Sphere Decoding for Multiple-Input Multiple-Output Systems using an Adaptive Statistical Threshold", 2009, X.Wu and J.S. Thompson, IET Signal Process, vol. 3, No. 6, pp. 433-444.

International Search Report in international application No. PCT/CN2014/092693, dated Apr. 29, 2015, 2 pgs.

English Translation of the Written Opinion of the International Search Authority in international application No. PCT/CN2014/092693, dated Apr. 29, 2015, 11 pgs.

"A low-complexity soft-mimo detector based on the fixed-complexity sphere decoder", Luis G. Barbero, T. Ramanajah and Colin Cowan, 2008, in IEEE International Conference on acoustics, speech and signal processing (ICASSP '08), Las Vegas, USA, 4 pgs.

R1-094679, 3GPP TSG RAN Working Group 1 Meeting #59, 2009, "UE selection diversity and SIC gain" Source: Pantech & Buritel, 2 pgs.

3GPP TR 36.814: "Evolved Universal Terrestrial Radio Access (E-UTRA); Further advancements for E-UTRA physical layer aspects" Mar. 2010, V9.0.0 (Release 9), 107 pgs.

3GPP TS 36.211: "Evolved Universal Terrestrial Radio Access (E-UTRA); Physical channels and Modulation" (Release 10), V10.6.0, Dec. 2012, 101 pgs.

"Fixing the Complexity of the Sphere Decoder for MIMO Detection," Luis G. Barbero and John S. Thompson, IEEE Transaction. on Wireless Communications, vol. 7, No. 6, Jun. 2008, pp. 2131-2142.

3GPP TS 36.101: "Evolved Universal Terrestrial Radio Access (E-UTRA); User Equipment (UE) radio transmission and reception" (Release 10) V10.6.0, Mar. 2012, 312 pgs.

"Soft-Output Sphere Decoding: Algorithms and VLSI Implementation", Christoph Studer, Andreas Burg, and Helmut Boleskei, Feb. 2008, IEEE Journal on Selected Areas in Communications, vol. 26, No. 2, 33 pgs.

\* cited by examiner

PATH DETECTION METHOD AND DEVICE, AND SPHERE DECODING DETECTION DEVICE

TECHNICAL FIELD

The disclosure relates to a Multiple-Input Multiple-Output (MIMO) detection technology in wireless communication, and in particular, to a path detection method and device, a Sphere Decoding (SD) detection device and a computer storage medium.

BACKGROUND

An important feature of a Long Term Evolution-Advanced (LTE-A) system of the 3rd Generation Partnership Project (3GPP) lies in that MIMO detection is adopted as a key technology of realizing high spectral efficiency to improve system capacity. Because of the requirement of the International Telecommunication Unit International Mobile Telecommunication-Advanced (ITU IMT-Advanced) for high spectral efficiency, the LTE-A puts forward that the spectral efficiency needs to meet the requirement for downlink with 30 bps/Hz and uplink with 15 bps/Hz. To satisfy these requirements, the LTE-A adopts 8 layers of downlink MIMO at most and 4 layers of uplink MIMO at most. So, supporting a multilayer MIMO detection technology becomes one of key technologies of deciding the performance of an LTE-A receiver.

In the MIMO detection technology, SD detection can make its performance approximate to the optimal performance, namely the Maximum Likelihood (ML) performance, and has a complexity much lower than that of the ML, so it is often selected to perform the MIMO detection. The SD detection is a process of cyclic search. Each cycle includes two steps: a first step of determining a smaller search radius of sphere space, namely searching a node with a distance to a received signal is less than a search radius; and the second step of replacing the previous search radius with the smaller search radius, so as to further reduce a search area. The two steps are repeated to gradually reduce the search area, until a maximum likelihood solution is found.

In Fixed-complexity Sphere Decoding (FSD) detection, in each layer of MIMO detection, a fixed number of nodes with a minimum distance to the received signal to determine the search radius, it has a fixed complexity and adopts a feed-forward structure with a hardware-friendly feature, and it is implemented easily by Very Large Scale Integration (VLSI), so the FSD detection is often selected as an MIMO detection method of a terminal side.

A soft-output MIMO detection technology used in concert with a subsequent soft decoder can make a system to achieve a better performance. As shown in FIG. 1, the main flow of SD detection in the LTE-A system includes a QR decomposition (a matrix is decomposed into a normal orthogonal matrix and an upper triangular matrix), an equalizing signal calculation, ML path detection, ML complementary set path detection, and a calculation and output of soft value information. The soft value information is a Log Likelihood Ratio (LLR). The sphere search (including the ML path detection and the ML complementary set path detection) is the body of the MIMO detection, and the main calculation complexity depends on the complexity of the sphere search. How to make the performance of the soft-output multilayer MIMO detection approximate to the ML performance and decrease the calculation complexity of the sphere search as much as possible is the technical problem to be solved.

SUMMARY

For solving the existing technical problem, the disclosure is intended to provide a path detection method and device, an SD detection device and a computer storage medium.

The disclosure provides a path detection method, which includes:

after an equalizing signal of a received signal is obtained, according to the pre-set maximum number of reserved nodes and maximum number of expanded branches of each layer, ML path detection and ML complementary set path detection are performed on the equalizing signal;

in the process of the ML path detection and ML complementary set path detection, an accumulated path measurement value is calculated after the search of each layer and each path is finished, and the accumulated path measurement value is compared with a pre-set search measurement threshold value; when the accumulated path measurement value is less than the search measurement threshold value, the search of this path is continued; when the accumulated path measurement value is greater than or equal to the search measurement threshold value, the search of this path is finished, and the search of the next path is started, until all the paths are searched.

In the above solution, the step that according to the pre-set maximum number of reserved nodes and maximum number of expanded branches of each layer, the ML path detection and the ML complementary set path detection are performed on the equalizing signal includes:

the top layer is initialized and branching search is performed on lower layers, the optimal node of the corresponding layer is reserved according to the pre-set maximum number of reserved nodes of each layer, and the number of the branches for which the search is performed on the lower layers is controlled according to the pre-set maximum number of expanded branches.

In the above solution, the method further includes:

after the search of a path is finished, if the accumulated path measurement value of the path is less than the pre-set search measurement threshold value, the search measurement threshold value is updated according to the accumulated path measurement value of the path, and the accumulated path measurement value subsequently calculated after the search of each layer and each path is finished is compared with the updated search measurement threshold value; and after the search of each path is finished, if the accumulated path measurement value of the path is less than the used current search measurement threshold value, the search measurement threshold value is updated according to the accumulated path measurement value of the path, and the accumulated path measurement value subsequently calculated after the search of each layer and each path is finished is compared with the updated search measurement threshold value.

In the above solution, the pre-set search measurement threshold value is less than or equal to the maximum of supported branch measurement value when each layer is configured with the maximum modulation under the maximum number of layers.

In the above solution, the equalizing signal of the received signal is obtained in the following way:

a QR decomposition is performed on a channel response matrix to obtain a Q matrix and an R matrix; and a conjugate transpose of the Q matrix is multiplied by the received signal to obtain the equalizing signal of the received signal.

The disclosure also provides a path detection device, which includes:

an ML path detection unit, which is arranged to, after the equalizing signal of the received signal is obtained, according to the pre-set maximum number of reserved nodes and maximum number of expanded branches of each layer, perform the ML path detection on the equalizing signal; the ML path detection unit is further arranged to, in the process of the ML path detection, calculate the accumulated path measurement value after the search of each layer and each path is finished, and compare the accumulated path measurement value with the pre-set search measurement threshold value; the ML path detection unit is further arranged to, when the accumulated path measurement value is less than the search measurement threshold value, continue the search of this path, and when the accumulated path measurement value is greater than or equal to the search measurement threshold value, finish the search of this path, and start the search of the next path, until all the paths are searched; and an ML complementary set path detection unit, which is arranged to, after the ML path detection is finished, perform the ML complementary set path detection; the ML complementary set path detection unit is further arranged to, in the process of the ML complementary set path detection, calculate the accumulated path measurement value after the search of each layer and each path is finished, and compare the accumulated path measurement value with the pre-set search measurement threshold value; the ML complementary set path detection unit is further arranged to, when the accumulated path measurement value is less than the search measurement threshold value, continue the search of this path, and when the accumulated path measurement value is greater than or equal to the search measurement threshold value, finish the search of this path, and start the search of the next path, until all the paths are searched.

In the above solution, the ML path detection unit and the ML complementary set path detection unit are further arranged to, initialize the top layer and perform the branching search on lower layers, reserve the optimal node of the corresponding layer according to the pre-set maximum number of reserved nodes of each layer, and control the number of the branches for which the search is performed on the lower layers according to the pre-set maximum number of expanded branches.

In the above solution, the ML path detection unit and the ML complementary set path detection unit are further arranged to, after the search of a path is finished, if the accumulated path measurement value of the path is less than the pre-set search measurement threshold value, update the search measurement threshold value according to the accumulated path measurement value of the path, and compare the accumulated path measurement value subsequently calculated after the search of each layer and each path is finished with the updated search measurement threshold value; and after the search of each path is finished, if the accumulated path measurement value of the path is less than the used current search measurement threshold value, update the search measurement threshold value according to the accumulated path measurement value of the path, and compare the accumulated path measurement value subsequently calculated after the search of each layer and each path is finished with the updated search measurement threshold value.

In the above solution, the pre-set search measurement threshold value is less than or equal to the maximum of supported branch measurement value when each layer is configured with the maximum modulation under the maximum number of layers.

The disclosure also provides an SD detection device, which includes the path detection device; the SD detection device further includes:

a QR decomposition unit, which is arranged to perform the QR decomposition on the channel response matrix to obtain the Q matrix and the R matrix;

an equalizing signal calculating unit, which is arranged to multiply the conjugate transpose of the Q matrix by the received signal to obtain the equalizing signal of the received signal; and a soft value information calculating unit, which is arranged to calculate soft value information on LLR of each bit and each symbol in each layer according to an ML path obtained by the ML path detection unit and an ML complementary set path obtained by the ML complementary set path detection unit.

The disclosure also provides a computer storage medium including a set of computer executable instructions for executing the path detection method.

The disclosure provides a path detection method and device, an SD detection device and a computer storage medium, which can decrease the calculation complexity of SD detection as much as possible under the condition of ensuring that the performance of the SD detection is approximate to the ML performance.

DETAILED DESCRIPTION

The technical solutions of the disclosure are further elaborated below in combination with the accompanying drawings and the specific embodiments.

Embodiment 1

Figure 1:
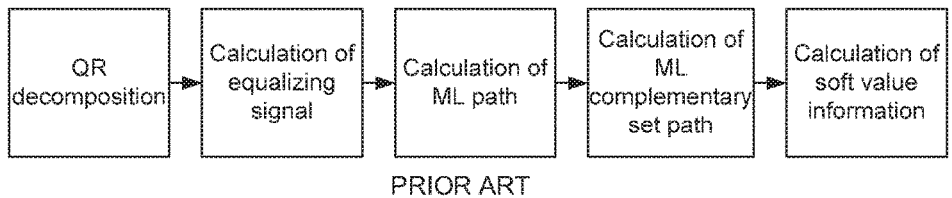
FIG. 1 is a main flow of soft-output MIMO detection in the LTE-A system.
Figure 2:
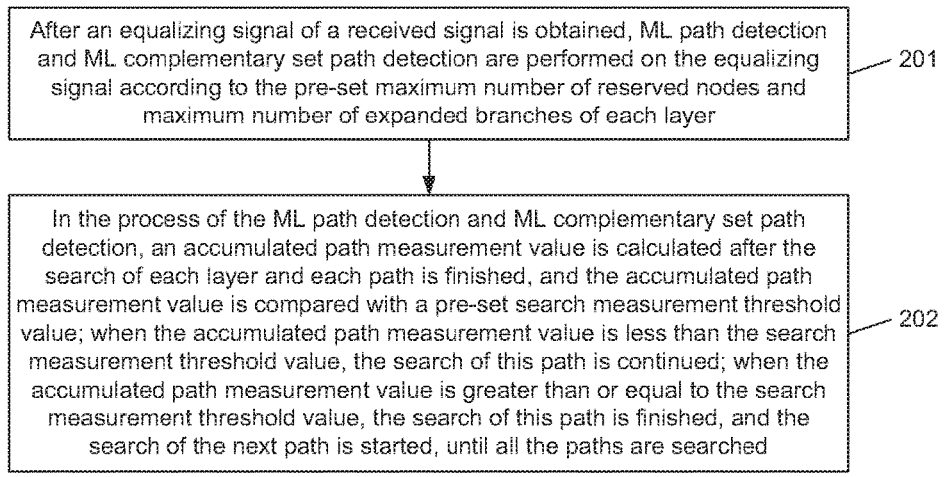
FIG. 2 is a flowchart of a path detection method according to embodiment 1 of the disclosure.

For decreasing the calculation complexity of SD detection as much as possible, the embodiment 1 of the disclosure mainly optimizes ML path detection and ML complementary set path detection in the process of SD detection. As shown in FIG. 2, a path detection method provided by the embodiment 1 of the disclosure mainly includes the following steps.

In Step 201, after an equalizing signal of a received signal is obtained, ML path detection and ML complementary set path detection are performed on the equalizing signal according to the pre-set maximum number of reserved nodes and maximum number of expanded branches of each layer.

Step 201 includes: the top layer is initialized and branching search is performed on lower layers, the optimal node of the corresponding layer is reserved according to the pre-set maximum number of reserved nodes of each layer, and the number of the branches for which the search is performed on the lower layers is controlled according to the pre-set maximum number of expanded branches.

In Step 202, in the process of the ML path detection and ML complementary set path detection, an accumulated path measurement value is calculated after the search of each layer and each path is finished, and the accumulated path measurement value is compared with a pre-set search measurement threshold value; when the accumulated path measurement value is less than the search measurement threshold value, the search of this path is continued; when the accumulated path measurement value is greater than or equal to the search measurement threshold value, the search of this path is finished, and the search of the next path is started, until all the paths are searched.

After the search of a path is finished, if the accumulated path measurement value of the path is less than the pre-set search measurement threshold value, the search measurement threshold value is updated according to the accumulated path measurement value of the path. And the accumulated path measurement value subsequently calculated after the search of each layer and each path is finished is compared with the updated search measurement threshold value.

And after the search of each path is finished, if the accumulated path measurement value of the path is less than the used current search measurement threshold value, the search measurement threshold value is updated according to the accumulated path measurement value of the path. And the accumulated path measurement value subsequently calculated after the search of each layer and each path is finished is compared with the updated search measurement threshold value.

The pre-set search measurement threshold value is less than or equal to the maximum of supported branch measurement value when each layer is configured with the maximum modulation under the maximum number of layers.

In the present embodiment, the equalizing signal of the received signal can be obtained in the following way.

A QR decomposition is performed on a channel response matrix to obtain a Q matrix and an R matrix.

Then, a conjugate transpose of the Q matrix is multiplied by the received signal to obtain the equalizing signal of the received signal.

Embodiment 2

Figure 3:
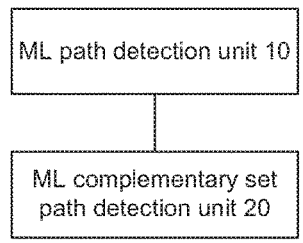
FIG. 3 is a schematic view of a structure of a path detection device according to embodiment 2 of the disclosure.

Corresponding to the path detection method in the embodiment 1, the embodiment 2 of the disclosure provides a path detection device; as shown in FIG. 3, the path detection device includes an ML path detection unit 10 and an ML complementary set detection unit 20.

The ML path detection unit 10 is arranged to, after the equalizing signal of the received signal is obtained, according to the pre-set maximum number of reserved nodes and maximum number of expanded branches of each layer, perform the ML path detection on the equalizing signal. The ML path detection unit is further arranged to, in the process of the ML path detection, calculate the accumulated path measurement value after the search of each layer and each path is finished, and compare the accumulated path measurement value with the pre-set search measurement threshold value. The ML path detection unit is further arranged to, when the accumulated path measurement value is less than the search measurement threshold value, continue the search of this path, and when the accumulated path measurement value is greater than or equal to the search measurement threshold value, finish the search of this path, and start the search of the next path, until all the paths are searched.

The ML complementary set path detection unit 20 is arranged to, after the ML path detection is finished, perform the ML complementary set path detection. The ML complementary set path detection unit is further arranged to, in the process of the ML complementary set path detection, calculate the accumulated path measurement value after the search of each layer and each path is finished, and compare the accumulated path measurement value with the pre-set search measurement threshold value. The ML complementary set path detection unit is further arranged to, when the accumulated path measurement value is less than the search measurement threshold value, continue the search of this path, and when the accumulated path measurement value is greater than or equal to the search measurement threshold value, finish the search of this path, and start the search of the next path, until all the paths are searched.

The ML path detection unit 10 and the ML complementary set path detection unit 20 are further arranged to, initialize the top layer and perform the branching search on lower layers, reserve the optimal node of the corresponding layer according to the pre-set maximum number of reserved nodes of each layer, and control the number of the branches for which the search is performed on the lower layers according to the pre-set maximum number of expanded branches.

The ML path detection unit 10 and the ML complementary set path detection unit 20 are further arranged to:

after the search of a path is finished, if the accumulated path measurement value of the path is less than the pre-set search measurement threshold value, update the search measurement threshold value according to the accumulated path measurement value of the path, and compare the accumulated path measurement value subsequently calculated after the search of each layer and each path is finished with the updated search measurement threshold value; and after the search of each path is finished, if the accumulated path measurement value of the path is less than the used current search measurement threshold value, update the search measurement threshold value according to the accumulated path measurement value of the path, and compare the accumulated path measurement value subsequently calculated after the search of each layer and each path is finished with the updated search measurement threshold value.

The ML path detection unit 10 and the ML complementary set path detection unit 20 can be realized by a Central Processing Unit (CPU), a Micro Processing Unit (MPU), a Digital Signal Processor (DSP) or a Field-Programmable Gate Array (FPGA) of the path detection device.

Embodiment 3

Figure 4:
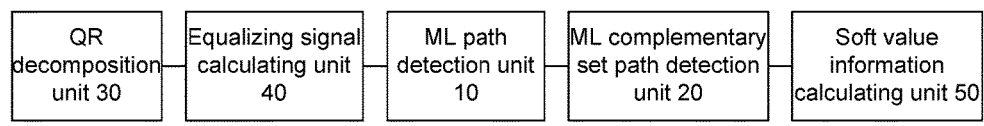
FIG. 4 is a schematic view of a structure of an SD detection device according to embodiment 3 of the disclosure.

Corresponding to the path detection device in the embodiment 2, the embodiment 3 of the disclosure also provides an SD detection device. As shown in FIG. 4, the SD detection device includes the ML path detection unit 10 and the ML complementary set path detection unit 20 in the embodiment 1, whose functions and effects are described in the embodiment 2 and will not be elaborated herein.

The SD detection device of the embodiment 3 of the disclosure further includes a QR decomposition unit 30, an equalizing signal calculating unit 40 and a soft value information calculating unit 50.

The QR decomposition unit 30 is arranged to perform the QR decomposition on the channel response matrix to obtain the Q matrix and the R matrix.

The equalizing signal calculating unit 40 is arranged to multiply the conjugate transpose of the Q matrix by the received signal to obtain the equalizing signal of the received signal.

The soft value information calculating unit 50 is arranged to calculate soft value information on LLR of each bit and each symbol in each layer according to an ML path obtained by the ML path detection unit and an ML complementary set path obtained by the ML complementary set path detection unit.

It is to be noted that the ML path detection unit 10, the ML complementary set path detection unit 20, the QR decomposition unit 30, the equalizing signal calculating unit 40 and the soft value information calculating unit 50 can be realized by the CPU, the MPU, the DSP or the FPGA of the SD detection device.

As described above, the embodiments of the disclosure can decrease, by means of the above technical means, the calculation complexity of SD detection as much as possible while ensuring that the performance of the SD detection is approximate to the ML performance, which is mainly reflected in the following aspects.

1. The maximum complexity is fixed. Unlike the traditional fixed-complexity algorithm, the embodiments of the disclosure only fix the maximum complexity of search. That is, in the path detection, the fixed maximum number of nodes and maximum number of expanded branches of each layer are reserved, and all the nodes and branches are reached only when the detection condition is worst.

2. The search measurement threshold value is set. Unlike the traditional fixed-complexity algorithm, in the embodiments of the disclosure, after the search of each layer and each path is finished, the obtained accumulated measurement value is compared with the pre-set threshold value, only when the accumulated measurement value is less than the threshold value, the search is continued. Otherwise, the search is stopped, and the search of another path is started.

3. The search measurement threshold value can be updated continuously. If a branch is searched completely, and the accumulated measurement value is less than the threshold value, the threshold value is updated according to the accumulated measurement value, so as to ensure further convergence of the subsequent search.

In addition, the disclosure can be compatible with different modulation modes and different numbers of MIMO layers, and has the following advantages:

A. the maximum complexity is fixed, which can ensure that the performance of the detection is approximate to the optimal performance too even when the condition is worst;

B. the search measurement threshold value is set, so that unnecessary calculation can be reduced, especially when the channel condition is good, the complexity is decreased rapidly;

C. a variable threshold (namely the threshold value is updated continuously) can further decrease the complexity of the subsequent search, so that the power consumption is reduced.

The path detection method and device, and the SD detection method and device are further elaborated below with examples.

Example 4

Supposing an MIMO system with encoding has $M_T$ transmitting antennae and $M_R$ receiving antennae, wherein $M_R \geq M_T$, and an encoded bit stream is mapped to a constellation diagram and form $M_T$ transmitting symbols $s \in o^{M_T}$, wherein o represents a set of constellation points, then the received signal of UE can be expressed as:

$$y = H*x + n \quad (1)$$

where, H represents a $M_R*M_T$ channel matrix, n is noise, then the output LLR value of the $k^{th}$ bit and the $i^{th}$ symbol can be expressed as:

$$LLR_{i,k} = \begin{cases} \frac{1}{N_0}(\lambda^{ML} - \lambda_{i,k}^{\overline{ML}}), & \text{if } x_{i,k}^{ML} = 0 \\ \frac{1}{N_0}(\lambda_{i,k}^{\overline{ML}} - \lambda^{ML}), & \text{if } x_{i,k}^{ML} = 1 \end{cases}$$

where, $N_0$ represents average variance of the noise n, $x_{i,k}$ represents the value of the position of the $k^{th}$ bit and the $i^{th}$ symbol, $\lambda^{ML} = \|y - Hx^{ML}\|^2$ and $$s^{ML} = \arg \min_{s \in o^{M_T}} \|y - Hs\|^2$$

denote the Euclidean distance of the ML path solution and the symbol value on each antenna of the ML path solution respectively;

$$\lambda_{i,k}^{\overline{ML}} = \min_{s \in \left\{x_{i,k}^{\overline{ML}}\right\}} \|y - Hs\|^2$$

represents the solution of the $\overline{ML}$ path of $x_{i,k}$, wherein, $$x \in x_{i,k}^{\left\{x_{i,k}^{\overline{ML}}\right\}}$$

represents a set obtained by removing the kth bit and the ith symbol $x_{i,k}$ and $x_{i,k}^{ML}$ from any combination of values of sent signals in the constellation diagram.

By performing the QR decomposition on H and preprocessing the received signal, namely H=QR, where Q represents an orthogonal matrix obtained by performing the QR decomposition on H, R represents an upper triangular matrix obtained by performing the QR decomposition on H, and multiplying both sides of the equal sign of the formula (1) by Q', wherein Q' is the conjugate transpose matrix of Q, if Z=Q'y, then Z=Q'y=Rs+Q'n.

The transformation of the ML path and the ML complementary set path of each bit and each symbol is:

$$\lambda^{ML} = \|Z - Rs^{ML}\|^2$$

$$\lambda_{i,k}^{ML} = \min_{s \in x_{i,k}^{(x_{i,k}^{ML})}} \|Z - Rs\|^2$$

where, $s^{ML}$ represents the symbol in the ML path, and s represents all symbol of $$x \in x_{i,k}^{(x_{i,k}^{ML})}$$

set. The ML detection can adopt the above formulae to perform traversal search to achieve the optimal performance. The Soft-output Fixed-complexity Sphere Decoding (SFSD) implements simplification by dividing the sphere search process of acquiring the soft value LLR into the ML path search and the ML complementary set path search.

Figure 5:
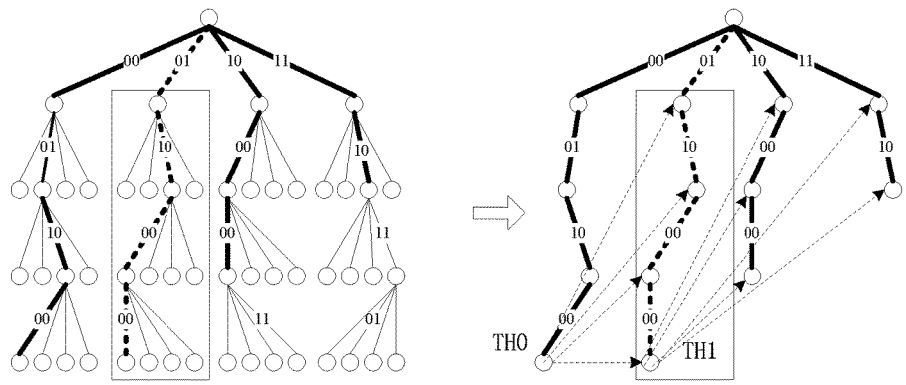
FIG. 5 is a schematic diagram of an ML path search tree according to embodiment 4 of the disclosure.

After performing the QR decomposition on the channel matrix H, evaluating the Euclidean distance can be regarded as the problem of searching and choosing tree nodes as shown in FIG. 5. For the ML detection, each father node includes several child nodes of the constellation points; from a root node to a leaf node, the paths from each father node to its child nodes are denoted by 00, 01, 10 and 11. For the SFSD detection, during the ML path search, node trees are chosen by using a set of the numbers of reserved nodes in the respective layers. For each father node, only the several child nodes with the optimal Euclidean distance are reserved. At the same time, path extension is performed from top to bottom according to the group of parameters. Finally, the optimal path is selected from the several reserved full paths as the ML path.

FIG. 5 shows a situation of Quadrature Phase Shift Keying (QPSK) of 4×4 MIMO. In the figure, the number of reserved nodes $n_s = (n_1, n_2, n_3, n_4)^T$ of each layer is (4, 1, 1, 1), wherein $n_i$ represents the number of child nodes reserved under the father node. It can be seen from the figure the number of full paths ultimately survived is $N_s = \Pi_{i=1}^{4} n_i = 4$ (as denoted by the bold line in the figure). At last, the optimal path of the four paths (as denoted by the bold dotted line in the figure) is the ML path.

In the embodiment of the disclosure, the maximum number of reserved nodes of each layer is set according to system parameters (the modulation mode and the number of layers) and performance requirements. For example, (4, 1, 1, 1) in FIG. 5 supports the QPSK, being bordered by the maximum of supported branch measurement value when each layer is configured with the maximum modulation under the maximum number of layers, the other various combinations of the modulation modes and the number of layers are configured under the branch measurement value. In such a manner, the maximum complexity of system search is determined, and the detection performance is ensured.

After a branch measurement value is calculated, the obtained accumulated measurement value is set as the search measurement threshold value TH0. After the search of each layer and each path is finished, the obtained accumulated measurement value is compared with the pre-set threshold value TH0. Only when the obtained accumulated measurement value is less than the threshold value, the search is continued; or else, the search is stopped, and the search of another path is started, as denoted by the dotted lines with arrows in FIG. 5. If a branch is searched completely, and the accumulated measurement value is less than the threshold value TH0, the threshold value is updated according to the currently obtained accumulated measurement value to obtain the updated threshold value TH1, so as to ensure further convergence of the subsequent search.

Similarly, the threshold value in the ML path search is set by using the same method as the method that is adopted in the ML complementary set path search.

Figure 6:
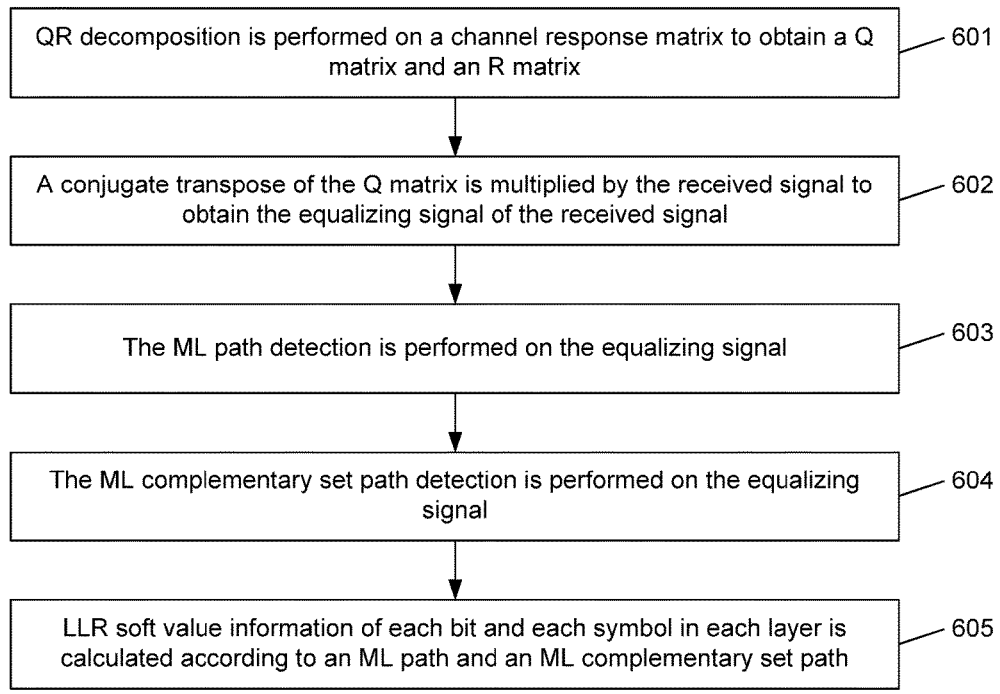
FIG. 6 is a flowchart of an SD detection method according to embodiment 4 of the disclosure.

Then, as shown in FIG. 6, an SD detection method provided by the embodiment 4 of the disclosure mainly includes the following steps.

In Step 601, the QR decomposition is performed on the channel response matrix to obtain the Q matrix and the R matrix.

In Step 602, the conjugate transpose of the Q matrix is multiplied by the received signal to obtain the equalizing signal of the received signal.

In Step 603, the ML path detection is performed on the equalizing signal. In the process of the ML path detection, the following operations are performed.

The top layer is initialized and branching search is performed on lower layers. The optimal node of the corresponding layer is reserved according to the pre-set maximum number of reserved nodes of each layer. And the number of the branches for which the search is performed on the lower layers is controlled according to the pre-set maximum number of expanded branches. The accumulated path measurement value is calculated after the search of each layer and each path is finished. And the accumulated path measurement value is compared with the pre-set search measurement threshold value. When the accumulated path measurement value is less than the search measurement threshold value, the search of this path is continued. When the accumulated path measurement value is greater than or equal to the search measurement threshold value, the search of this path is finished, and the search of the next path is started, until all the paths are searched.

In addition, after the search of a path is finished, if the accumulated path measurement value of the path is less than the pre-set search measurement threshold value, the search measurement threshold value is updated according to the accumulated path measurement value of the path. And the accumulated path measurement value subsequently calculated after the search of each layer and each path is finished is compared with the updated search measurement threshold value.

After the search of each path is finished, if the accumulated path measurement value of the path is less than the used current search measurement threshold value, the search measurement threshold value is updated according to the accumulated path measurement value of the path. And the accumulated path measurement value subsequently calculated after the search of each layer and each path is finished is compared with the updated search measurement threshold value.

In Step 604, the ML complementary set path detection is performed on the equalizing signal. In the process of the ML complementary set path detection, the following operations are performed.

The top layer is initialized and branching search is performed on lower layers, the optimal node of the corresponding layer is reserved according to the pre-set maximum number of reserved nodes of each layer. And the number of the branches for which the search is performed on the lower layers is controlled according to the pre-set maximum number of expanded branches. The accumulated path measurement value is calculated after the search of each layer and each path is finished. And the accumulated path measurement value is compared with the pre-set search measurement threshold value. When the accumulated path measurement value is less than the search measurement threshold value, the search of this path is continued. When the accumulated path measurement value is greater than or equal to the search measurement threshold value, the search of this path is finished, and the search of the next path is started, until all the paths are searched.

In addition, after the search of a path is finished, if the accumulated path measurement value of the path is less than the pre-set search measurement threshold value, the search measurement threshold value is updated according to the accumulated path measurement value of the path. And the accumulated path measurement value subsequently calculated after the search of each layer and each path is finished is compared with the updated search measurement threshold value.

After the search of each path is finished, if the accumulated path measurement value of the path is less than the used current search measurement threshold value, the search measurement threshold value is updated according to the accumulated path measurement value of the path. And the accumulated path measurement value subsequently calculated after the search of each layer and each path is finished is compared with the updated search measurement threshold value.

In Step 605, the soft value information on LLR of each bit and each symbol in each layer is calculated according to the ML path and the ML complementary set path.

The advantages of the disclosure are illustrated below by simulation of a receiver of the LTE-A system (Release 10). The specific simulation conditions refer to the 3GPP standard [8], and the main simulation parameters are shown in the following Table 1.

TABLE 1

| Parameter | Unit | Value |
|---|---|---|
| Uplink downlink configuration | | 1 |
| Special subframe configuration (Note 2) | | 4 |
| Cyclic prefix | | Normal |
| Cell ID | | 0 |
| Inter-TTI Distance | | 1 |
| Number of HARQ processes | Processes | 7 |
| Maximum number of HARQ transmission | | 4 |
| Redundancy version coding sequence | | {0, 1, 2, 3} for QPSK and 16QAM<br>{0, 0, 1, 2} for 64QAM |
| Number of OFDM symbols for PDCCH | OFDM symbols | 2 |
| ACK/NACK feedback mode | | Multiplexing |
| Cell-specific reference symbols | | Antenna port 0, 1 |
| UE-specific reference symbols | | Antenna port 7, 8, 9, 10 |
| Number of allocated resource blocks | PRB | 50 |
| MCS | | CW1: QPSK, 1/3; CW2: 64 QAM, 3/4; |
| Propagation Condition | | Block Fading |
| Correlation Matrix and Antenna Configuration | | 4 × 4 layer, Low correlation |
| M-SFSD | | One CW for two layers (x 2 1 1), 6 iteration, x is the constellation point number |

Figure 7:
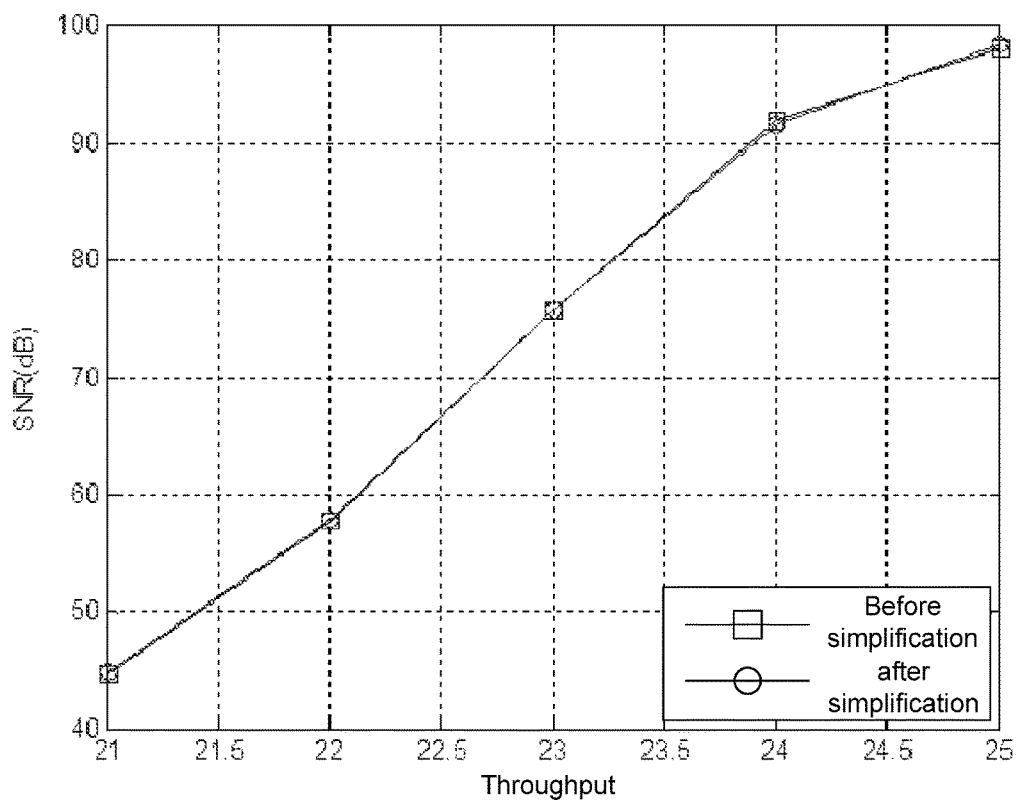
FIG. 7 is a schematic diagram of performance comparison between a simulation example of the disclosure and the traditional art.

The throughput performance and complexity before and after the simplification are compared; the performance simulation result is shown in FIG. 7, and the complexity statistics is shown in FIG. 2. Under the full-link simulation condition, the performance remains unchanged, but a lot of calculation can be decreased after the disclosure is adopted.

TABLE 2

| | Addition | Multiplication |
|---|---|---|
| The embodiments of the disclosure is not adopted | 31225 | 386 |
| The embodiments of the disclosure is adopted | 13576 | 152 |

As described above, because the maximum complexity is fixed, the disclosure can ensure that the performance of the detection is approximate to the optimal performance even when the condition is worst (the maximum complexity is obtained by simulation to ensure the optimal value of performance comparison). At the same time, by setting the search measurement threshold value, unnecessary calculation can be reduced, especially when the channel condition is good, the complexity is decreased rapidly (when the condition is good, the probability of high-level configuration is big, and the complexity is high), so that the average power consumption of system is reduced greatly.

The disclosure also provides computer storage medium, which contains a set of computer executable instructions for executing the path detection method provided by any embodiment.

Those skilled in the art will appreciate that the embodiments of the disclosure can be provided as a method, a system or a computer program product. So, the disclosure can adopt the forms of full hardware embodiment, full software embodiment, or embodiment combining software and hardware. Besides, this disclosure can adopt the form of a computer program product which is implemented on one or more computer available storage media including computer available program codes, wherein the storage media include, but are not limited to, a magnetic disk memory, a Compact Disc-ROM (CD-ROM), and so on.

This disclosure is described according to the flowcharts and/or block diagrams of the method, the device (system) and the computer program product in the embodiments of this disclosure. It should be understood that each flow and/or block in the flowchart and/or block diagram, and the combination of the flow and/or block in the flowchart and/or block diagram can be implemented by the computer program instructions. These computer program instructions can be provided to the processing unit of the general-purpose computer, the special-purpose computer, the embedded processor or other programmable data processing equipment to generate a machine, so that instructions which are executed by the processing unit of the computer or other programmable data processing equipment generate the device which is used for implementing the specified functions in one or more flows of the flowchart and/or one or more blocks of the block diagram.

These computer program instructions can also be stored in the computer-readable memory which can guide the computer or other programmable data processing equipment to work in a particular way, so that the instructions stored in the computer-readable memory generate the product including the instruction device, wherein the instruction device implements the specified functions in one or more flows of the flowchart and/or one or more blocks of the block diagram.

These computer program instructions can also be loaded on the computer or other programmable data processing equipment, so that a series of operation steps are performed on the computer or other programmable data processing equipment to generate the processing implemented by the computer, and the instructions executed on the computer or other programmable data processing equipment provide the steps for implementing the specified functions in one or more flows of the flowchart and/or one or more blocks of the block diagram.

The above is only the preferred embodiments of the disclosure and is not intended to limit the scope of the claims of the disclosure.

What is claimed is:

1. A path detection method, comprising:
    after an equalizing signal of a received signal is obtained, according to a pre-set maximum number of reserved nodes and maximum number of expanded branches of each layer, performing Maximum Likelihood (ML) path detection and ML complementary set path detection on the equalizing signal;
    in the process of the ML path detection and ML complementary set path detection, calculating an accumulated path measurement value after a search of each layer and each path is finished, and comparing the accumulated path measurement value with a pre-set search measurement threshold value; when the accumulated path measurement value is less than the pre-set search measurement threshold value, continuing a search of a path; when the accumulated path measurement value is greater than or equal to the pre-set search measurement threshold value, finishing the search of the path, and starting a search of a next path, until all paths are searched; and
    after the search of the path is finished, if the accumulated path measurement value of the path is less than the pre-set search measurement threshold value, updating the pre-set search measurement threshold value according to the accumulated path measurement value of the path to yield an updated search measurement threshold value, and comparing the accumulated path measurement value subsequently calculated after the search of each layer and each path is finished with the updated search measurement threshold value.

2. The path detection method according to claim 1, wherein according to the pre-set maximum number of reserved nodes and maximum number of expanded branches of each layer, performing the ML path detection and ML complementary set path detection on the equalizing signal comprises:
    initializing a top layer and performing branching search on lower layers, reserving an optimal node of a corresponding layer according to the pre-set maximum number of reserved nodes of each layer, and controlling a number of branches for which the branching search is performed on the lower layers according to the pre-set maximum number of expanded branches.

3. The path detection method according to claim 2, wherein the pre-set search measurement threshold value is less than or equal to a maximum of supported branch measurement values when each layer is configured with a maximum modulation under a maximum number of layers.

4. The path detection method according to claim 2, wherein the equalizing signal of the received signal is obtained in the following way:
    performing a QR decomposition on a channel response matrix to obtain a Q matrix and an R matrix; and
    multiplying a conjugate transpose of the Q matrix by the received signal to obtain the equalizing signal of the received signal.

5. The path detection method according to claim 1, further comprising:
    after a search of each path is finished, if the accumulated path measurement value of the path is less than a used current search measurement threshold value, updating the used current search measurement threshold value according to the accumulated path measurement value of the path to yield a new updated search measurement threshold value, and comparing the accumulated path measurement value subsequently calculated after the search of each layer and each path is finished with the new updated search measurement threshold value.

6. The path detection method according to claim 5, wherein the pre-set search measurement threshold value is less than or equal to a maximum of supported branch measurement values when each layer is configured with a maximum modulation under a maximum number of layers.

7. The path detection method according to claim 5, wherein the equalizing signal of the received signal is obtained in the following way:
    performing a QR decomposition on a channel response matrix to obtain a Q matrix and an R matrix; and
    multiplying a conjugate transpose of the Q matrix by the received signal to obtain the equalizing signal of the received signal.

8. The path detection method according to claim 1, wherein the pre-set search measurement threshold value is less than or equal to a maximum of supported branch measurement values when each layer is configured with a maximum modulation under a maximum number of layers.

9. The path detection method according to claim 1, wherein the equalizing signal of the received signal is obtained in the following way:
    performing a QR decomposition on a channel response matrix to obtain a Q matrix and an R matrix; and
    multiplying a conjugate transpose of the Q matrix by the received signal to obtain the equalizing signal of the received signal.

10. A non-transitory computer-readable storage medium comprising a set of computer executable instructions for executing a path detection method according to claim 1.

11. A path detection device, comprising:
    at least one processor; and
    a memory arranged to store instructions executable by the at least one processor,
    wherein the at least one processor is arranged to:
        after an equalizing signal of a received signal is obtained, according to a pre-set maximum number of reserved nodes and maximum number of expanded branches of each layer, perform Maximum Likelihood (ML) path detection on the equalizing signal; in the process of the ML path detection, calculate an accumulated path measurement value after a search of each layer and each path is finished, and compare the accumulated path measurement value with a pre-set search measurement threshold value; when the accumulated path measurement value is less than the pre-set search measurement threshold value, continue a search of a path, and when the accumulated path measurement value is greater than or equal to the pre-set search measurement threshold value, finish the search of the path, and start a search of a next path, until all paths are searched;
        after the ML path detection is finished, perform ML complementary set path detection; in the process of the ML complementary set path detection, calculate the accumulated path measurement value after the search of each layer and each path is finished, and compare the accumulated path measurement value with the pre-set search measurement threshold value; when the accumulated path measurement value is less than the pre-set search measurement threshold value, continue the search of the path, and when the accumulated path measurement value is greater than or equal to the pre-set search measurement threshold value, finish the search of the path, and start a search of a next path, until all paths are searched; and after the search of the path is finished, if the accumulated path measurement value of the path is less than the pre-set search measurement threshold value, update the pre-set search measurement threshold value according to the accumulated path measurement value of the path to yield an updated search measurement threshold value, and compare the accumulated path measurement value subsequently calculated after the search of each layer and each path is finished with the updated search measurement threshold value.

12. The path detection device according to claim 11, wherein the at least one processor is further arranged to, initialize a top layer and perform branching search on lower layers, reserve an optimal node of a corresponding layer according to the pre-set maximum number of reserved nodes of each layer, and control a number of branches for which the branching search is performed on the lower layers according to the pre-set maximum number of expanded branches.

13. The path detection device according to claim 12, wherein the pre-set search measurement threshold value is less than or equal to a maximum of supported branch measurement values when each layer is configured with a maximum modulation under a maximum number of layers.

14. The path detection device according to claim 11, wherein the at least one processor is further arranged to,
after a search of each path is finished, if the accumulated path measurement value of the path is less than a used current search measurement threshold value, update the used current search measurement threshold value according to the accumulated path measurement value of the path to yield a new updated search measurement threshold value, and compare the accumulated path measurement value subsequently calculated after the search of each layer and each path is finished with the new updated search measurement threshold value.

15. The path detection device according to claim 14, wherein the pre-set search measurement threshold value is less than or equal to a maximum of supported branch measurement values when each layer is configured with a maximum modulation under a maximum number of layers.

16. The path detection device according to claim 11, wherein the pre-set search measurement threshold value is less than or equal to a maximum of supported branch measurement values when each layer is configured with a maximum modulation under a maximum number of layers.

17. A Sphere Decoding (SD) detection device, comprising a path detection device according to claim 11;
the SD detection device further comprises:
at least one first processor; and
a memory arranged to store instructions executable by the at least one first processor,
wherein the at least one first processor is arranged to:
perform a QR decomposition on a channel response matrix to obtain a Q matrix and an R matrix;
multiply a conjugate transpose of the Q matrix by the received signal to obtain the equalizing signal of the received signal; and
calculate soft value information on Log Likelihood Ratio (LLR) of each bit and each symbol in each layer according to a Maximum Likelihood (ML) path and an ML complementary set path.

18. The SD detection device according to claim 17, wherein the at least one processor is further arranged to, initialize a top layer and perform branching search on lower layers, reserve an optimal node of a corresponding layer according to the pre-set maximum number of reserved nodes of each layer, and control a number of branches for which the branching search is performed on the lower layers according to the pre-set maximum number of expanded branches.

19. The SD detection device according to claim 17, wherein the at least one processor is further arranged to,
after a search of each path is finished, if the accumulated path measurement value of the path is less than a used current search measurement threshold value, update the used current search measurement threshold value according to the accumulated path measurement value of the path to yield a new updated search measurement threshold value, and compare the accumulated path measurement value subsequently calculated after the search of each layer and each path is finished with the new updated search measurement threshold value.

20. The SD detection device according to claim 17, wherein the pre-set search measurement threshold value is less than or equal to a maximum of supported branch measurement values when each layer is configured with a maximum modulation under a maximum number of layers.

* * * * *